(12) United States Patent
Rogers

(10) Patent No.: US 8,182,045 B2
(45) Date of Patent: May 22, 2012

(54) COVER FOR A SIDE-DUMP TRAILER OR TRUCK

(76) Inventor: Ralph R. Rogers, Dakota Dunes, SD (US)

( * ) Notice: Subject to any disclaimer, the term of this patent is extended or adjusted under 35 U.S.C. 154(b) by 175 days.

(21) Appl. No.: 12/803,882

(22) Filed: Jul. 8, 2010

(65) Prior Publication Data

US 2012/0007411 A1 Jan. 12, 2012

(51) Int. Cl.
*B60P 1/26* (2006.01)
(52) U.S. Cl. ...... 298/23 C; 298/17.7; 298/18; 298/23 R; 296/100.1
(58) Field of Classification Search ............. 298/6, 17.6, 298/17.7, 18, 22 P, 23 R, 23 C; 296/100.02, 296/100.06, 100.08, 100.1
See application file for complete search history.

(56) References Cited

U.S. PATENT DOCUMENTS

| | | | |
|---|---|---|---|
| 4,302,043 A | 11/1981 | Dimmer et al. | |
| 5,498,066 A * | 3/1996 | Cuthbertson et al. | 298/23 C |
| 6,206,477 B1 * | 3/2001 | Rexus et al. | 298/23 MD |
| 6,209,449 B1 | 4/2001 | Otto et al. | |
| 6,402,453 B1 * | 6/2002 | Jensen et al. | |
| 7,032,950 B2 | 4/2006 | Eggers et al. | |

* cited by examiner

*Primary Examiner* — Stephen Gordon
(74) *Attorney, Agent, or Firm* — Dennis L. Thomte; Thomte Patent Law Office LLC

(57) ABSTRACT

A cover for a side-dump trailer or truck is disclosed wherein a rigid cover comprised of metal, fiberglass or plastic is movably mounted with respect to the side-dump trailer or truck so that the cover may be moved from a closed position over the upper end of the side-dump body or which may be pivotally moved to either side of the side-dump body so that the side-dump body may be pivotally moved to a dumping position opposite to that of the cover.

2 Claims, 5 Drawing Sheets

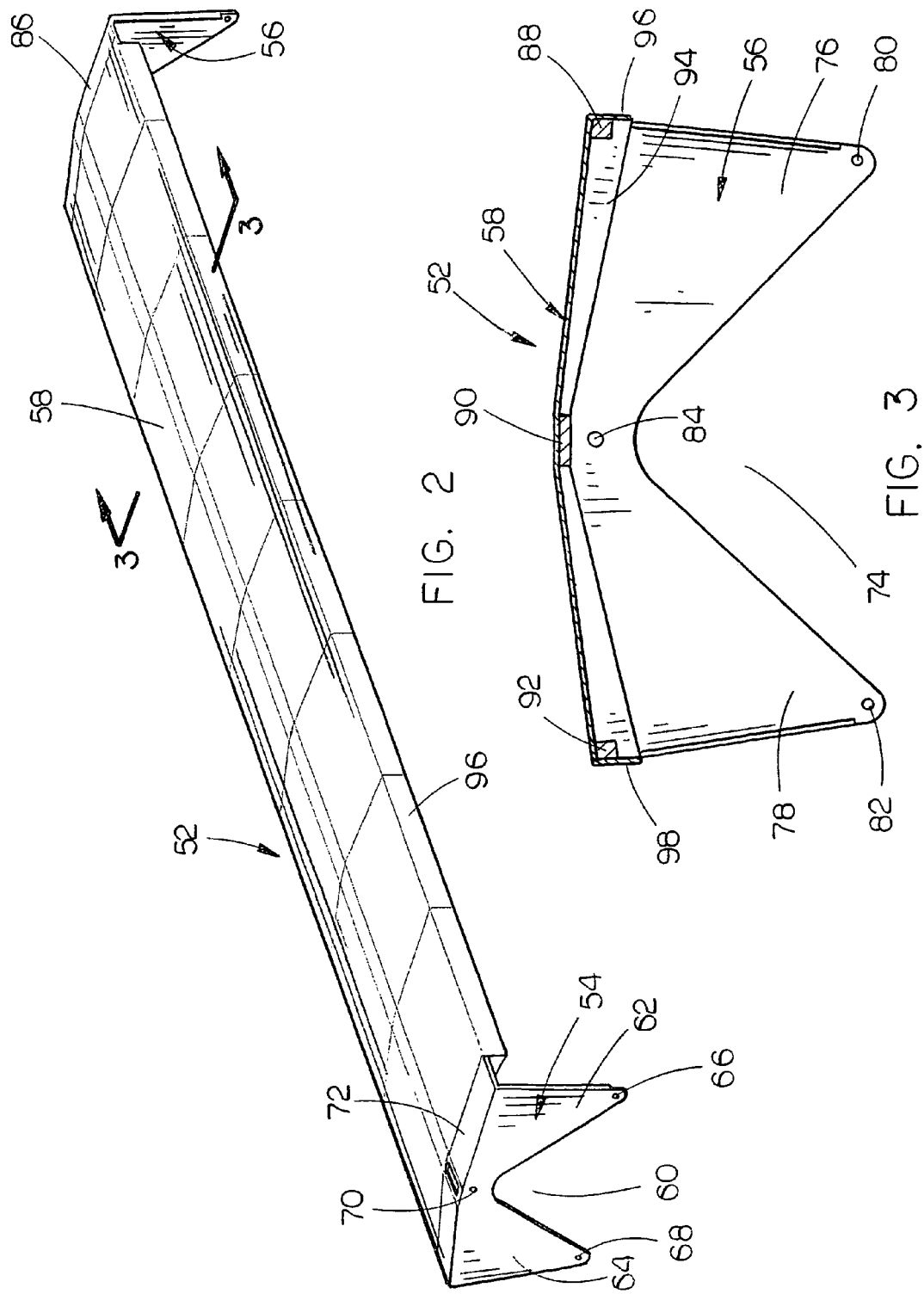

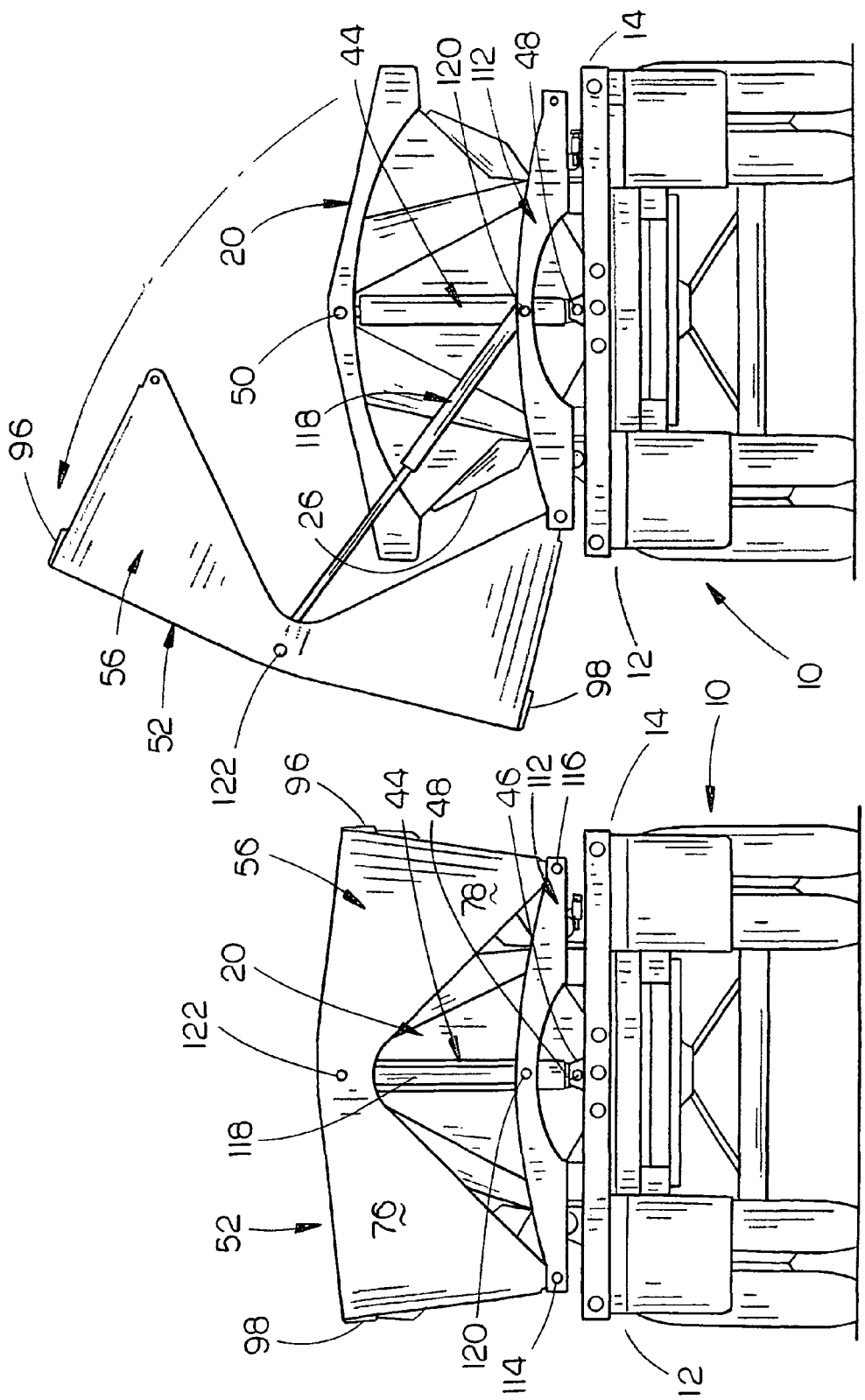

COVER FOR A SIDE-DUMP TRAILER OR TRUCK

BACKGROUND OF THE INVENTION

1. Field of the Invention

This invention relates to a cover for a side-dump trailer or truck and more particularly to a cover which is comprised of metal, fiberglass or plastic. Even more particularly, this invention relates to a cover for a side-dump trailer or truck which may be pivotally moved from its closed position over the upper end of the side-dump trailer or truck to an open position at either side of the side-dump trailer or truck.

2. Description of the Related Art

In many states and cities, the open upper end of a truck body or box must be covered when the truck body or box is hauling material therein. Flexible canvas tarp systems have been provided for standard truck bodies as seen in U.S. Pat. No. 4,302,043. Flexible canvas tarps have also been provided for use with side-dump bodies as seen in U.S. Pat. Nos. 6,209,449 and 7,032,950. The flexible canvas tarps of the prior art tend to "flap" in the wind which may cause wear and ultimate tearing thereof. Further, when the flexible canvas tarps are used to cover the open upper end of a truck body which contains protruding metal, concrete pieces, blocks, etc., the canvas tarp may be torn upon contact with the same. Further, when the canvas tarp has been rolled for storage at one side of a side-dump body, the contents of the side-dump body may contact the rolled-up tarp if the side-dump body is dumped towards the side where the rolled-up tarp is positioned thereby causing damage to the tarp.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A right cover is described and shown for a side-dump body mounted on a trailer or truck. The cover may also be used on a conventional non-pivoting truck box or on an end-dump body. The side-dump trailer or truck comprises an elongated wheeled frame having a forward end, a rearward end, and first and second sides. A first saddle support is mounted on the wheeled frame adjacent the forward end of the wheeled frame at the first side thereof. A second saddle support is mounted on the wheeled frame adjacent the forward end thereof at the second side thereof. A third saddle support is mounted on the wheeled frame adjacent the rearward end thereof at the first side thereof. A fourth saddle support is mounted on the wheeled frame adjacent the rearward end thereof at the second side thereof.

An elongated side-dump body is movably positioned on the wheeled frame and has a forward end, a rearward end and opposite sides. The side-dump body includes a bottom portion having a forward end and a rearward end. The side-dump body also includes an upstanding forward wall member or bulkhead with upper and lower ends, an upstanding rearward wall member or bulkhead with upper and lower ends, a first side wall having an upper end, and a second side wall having an upper end. The bottom portion of the side-dump body may be either horizontally disposed or arcuate in shape. The side-dump body has an open upper end for receiving material to be transported.

A first pivot pin is secured to the first side of the side-dump body adjacent the forward end thereof which is adapted to be removably and pivotally received by the first saddle support. A second pivot pin is secured to the second side of the side-dump body adjacent the forward end thereof which is adapted to be removably and pivotally received by the second saddle support. A third pivot pin is secured to the second side wall of the side-dump body adjacent the rearward end thereof which is adapted to be removably and pivotally received by the third saddle support. A fourth pivot pin is secured to the second side wall of the side-dump body adjacent the rearward end thereof which is adapted to be removably and pivotally received by the fourth saddle support. First, second, third and fourth locking devices are selectively movable between locked and unlocked positions for selectively maintaining the first, second, third and fourth pivot pins in the first, second, third and fourth saddle supports respectively.

The side-dump trailer also includes a first power cylinder having a base end pivotally secured to the wheeled frame by a fifth pivot pin intermediate the sides thereof forwardly of the side-dump body and a rod end which is pivotally secured to the forward wall member adjacent the upper end thereof by a sixth pivot pin. A second power cylinder is also provided which has a base end pivotally secured to the wheeled frame by a seventh pivot pin intermediate the sides thereof rearwardly of the side-dump body and a rod end which is pivotally secured to the rearward wall member adjacent the upper end thereof by an eighth pivot pin. The power cylinders are adapted to pivot the side-dump body with respect to the wheeled frame to selectively dump materials therefrom from either side of the side-dump trailer or truck.

The rigid cover of this invention is comprised of metal, fiberglass or plastic and which is selectively pivotally movably positioned on the side-dump body. The cover is movable from an operative or closed position wherein it extends over the open upper end of the side-dump body to an inoperative or open position at either side of the side-dump body to enable the side-dump body to pivotally move between its transport position to either of its dumping positions so that the contents of the side-dump body may be dumped therefrom.

It is therefore a principal object of the invention to provide a rigid cover for a side-dump body, an end-dump body or a conventional truck box.

A further object of the invention is to provide a rigid cover which is selectively pivotally movably positioned on a side-dump body which extends over the open upper end thereof but which is movable from its operative closed position to an inoperative open position at either side of the side-dump body.

A further object of the invention is to provide a rigid cover for a side-dump body which is comprised of either metal, fiberglass or plastic.

A further object of the invention is to provide a rigid cover which is economical of manufacture, refined in appearance and durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a perspective view of the cover of this invention;

FIG. 3 is a sectional view of the cover of this invention as seen on lines 3-3 of FIG. 2;

FIG. 4 is a rear view of the cover of this invention mounted on a side-dump trailer with the side-dump body in its transport position and the cover in its closed position;

FIG. 5 is a view similar to FIG. 4 except the cover has been pivoted to a position at the left side of the side-dump body;

DESCRIPTION OF THE PREFERRED EMBODIMENT

Figure 1:
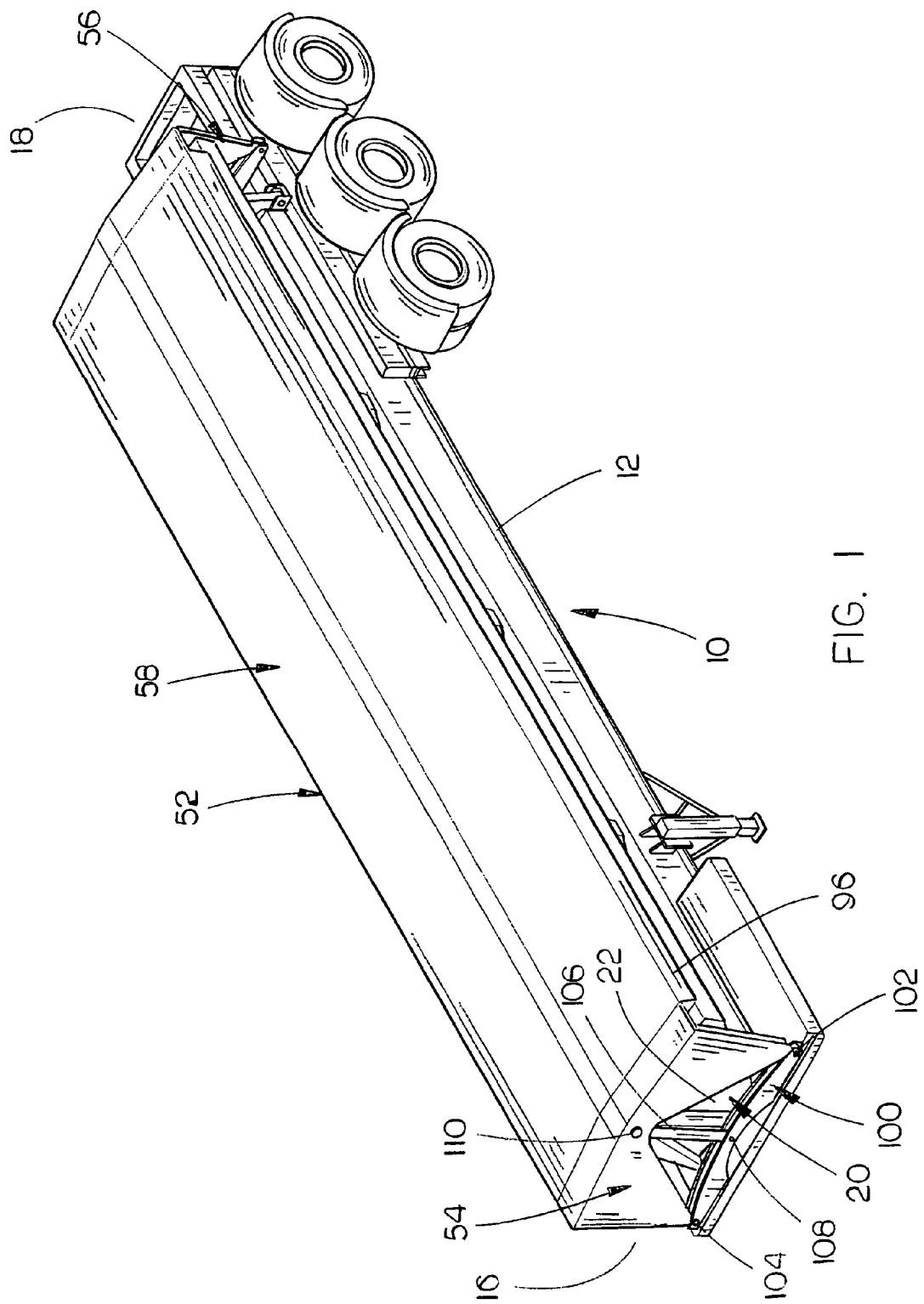
FIG. 1 is a perspective view of the cover of this invention mounted on a side-dump trailer with the cover being in a closed position.
Figure 6:
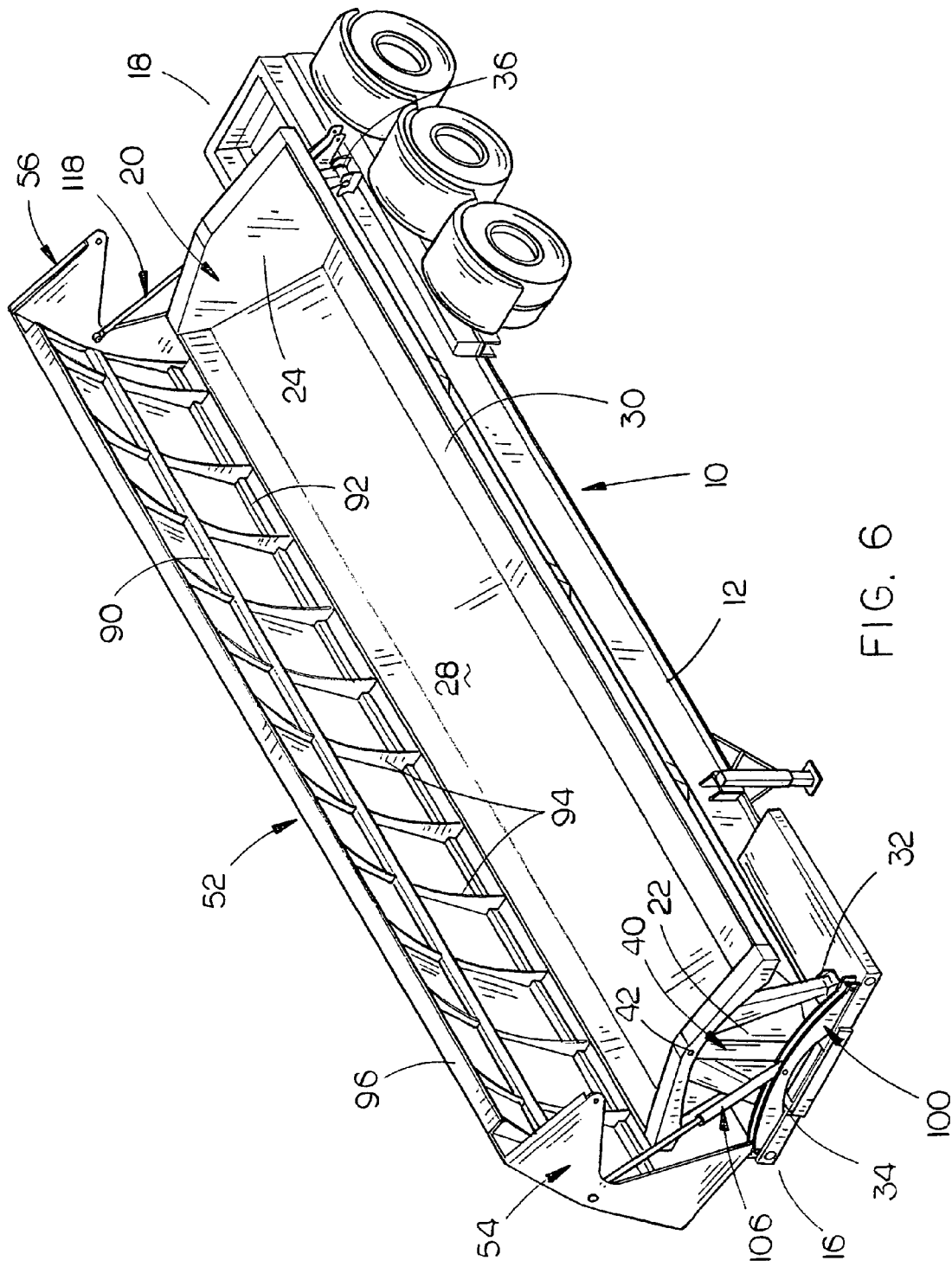
FIG. 6 is a perspective view illustrating the cover having been pivoted to the right side of the side-dump body.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In FIGS. 1 and 4-7, the numeral 10 refers generally to a wheeled frame which may be part of a truck or trailer. For purposes of description, the wheeled frame 10 will be described as having a first side 12, a second side 14, a forward end 16 and a rearward end 18. A conventional side-dump body such as disclosed in U.S. Pat. No. 5,480,214 is illustrated in FIGS. 1 and 4-7 and is referred to generally by the reference numeral 20. For purposes of description, side-dump body 20 will be described as having a forward end wall or bulkhead 22, a rearward end wall or bulkhead 24, a first side wall 26, a second side wall 28, and a bottom wall 30 which may be curved or flat. Bottom wall 30 may be integrally formed with side walls 26 and 28.

A pivot pin 32 is provided at the forward end of body 20 adjacent side wall 26. Pivot pin 34 is provided at the forward end of body 20 adjacent side wall 28. Pivot pin 36 is provided at the rearward end of body 20 adjacent side 26 and pivot pin 38 is provided at the rearward end of body 20 adjacent side wall 28.

A saddle support, such as disclosed in U.S. Pat. No. 5,480,214, is secured to frame 10 at the forward end thereof which is adapted to receive the pivot pin 32 therein. A locking device, such as disclosed in U.S. Pat. No. 5,480,214, selectively maintains the pivot pin 32 in the saddle support. Similarly, a saddle support is secured to the frame 10 which is adapted to receive the pivot pin 34 therein. A locking device selectively locks pivot pin 34 into the saddle support. Similarly, a saddle support is secured to the frame 10 at the rearward end thereof which is adapted to receive the pivot pin 36 therein. A locking device selectively locks pivot pin 36 into saddle support. A saddle support is secured to the rearward end of the frame 10 and is adapted to receive the pivot pin 38 therein. A locking device selectively locks the pivot pin 38 in the saddle support. U.S. Pat. No. 5,480,214 is relied upon to complete the disclosure relating to the above-described saddle supports and locking devices.

The numeral 40 refers to a hydraulic cylinder which has its lower end pivotally secured to the forward end of frame 10 at 58 by means of a pivot pin such as shown in the '214 Patent.

The rod end of hydraulic cylinder 40 is pivotally secured to the pivot pin 42 which extends forwardly from the upper end of the forward wall member 22.

The numeral 44 refers to a hydraulic cylinder which is positioned at the rearward end of the side-dump body and which has its base end secured to the frame 10 at 46 by pivot pin 48. The rod end of hydraulic cylinder 44 is pivotally secured to a pivot pin 50 which extends rearwardly from the upper end of rearward wall member 24.

The side-dump body of FIGS. 1 and 4-7 is selectively pivotally movable in conventional fashion so as to be able to discharge the contents of the side-dump body to either side of the frame 10 in conventional fashion such as disclosed in U.S. Pat. No. 5,480,214, the disclosure of which is herein incorporated by reference as stated above.

The numeral 52 refers to the cover of this invention. Cover 52 is constructed of a rigid material such as steel, aluminum, plastic or fiberglass. Cover 52 includes a front support 54, a back support 56, and a top cover portion 58 which is secured to and which extends between the front support 54 and the back support 56.

Front support 54 has a generally inverted V-shaped opening 60 formed therein which defines leg portions 62 and 64 having openings 66 and 68 formed in the lower ends thereof respectively. Front support 54 is provided with a centrally positioned opening 70 adjacent its upper end. Front support 54 includes a rearwardly extending top plate 72 at its upper end. The rearward end of top plate 52 is secured to the forward end of top cover portion 58.

Back support 56 has a generally inverted V-shaped opening 74 formed therein which defines leg portions 76 and 78 having openings 80 and 82 formed in the lower ends thereof respectively. Back support 56 is provided with a centrally positioned opening 84 adjacent its upper end. Back support 56 includes a forwardly extending top plate 86 at its upper end. The forward end of top plate 86 is secured to the rearward end of top cover portion 58.

Cover 52 is preferably provided with longitudinally extending reinforcing beams 88, 90 and 92 which are positioned at the underside of top cover portion 58 as seen in FIG. 3 and which extend between front support 54 and back support 56. Cover 52 is also preferably provided with a plurality of spaced-apart and transversely extending reinforcing ribs 94 which extend between the beams 88 and 90 and 90 and 92 as seen in FIG. 3. Top cover portion 58 is also provided with downwardly extending side wall portions 96 and 98 at its opposite sides.

A transversely extending support 100 is secured to the frame means 10 forwardly of the forward end wall 22. The lower ends of leg portions 62 and 64 of front support 54 are selectively pivotally secured to the ends of support 100 by pivot pins 102 and 104 respectively which extend through openings in support 100 and the openings 66 and 68 in leg portions 62 and 64 respectively. A hydraulic cylinder 106 has its base end pivotally secured to support 100 by pivot pin 108 and has its rod end pivotally secured to front support 54 by means of a pivot pin 110 which is received in opening 70 of front support 54.

A transversely extending support 112 is secured to the frame means 10 rearwardly of the rearward end wall 24. The lower ends of leg portions 76 and 78 of back support 56 are selectively pivotally secured to the ends of support 112 by pivot pins 114 and 116 respectively which extend through openings in support 112 and the openings 80 and 82 in leg portions 76 and 78 respectively. A hydraulic cylinder 118 has its base end pivotally secured to support 112 by pivot pin 120 and has its rod end pivotally secured to back support 56 by means of a pivot pin 122 which is received in opening 84 of back support 56.

Assuming that the side-dump body is in its transport or loading position of FIG. 1, and the cover 52 is in its operative closed position, as seen in FIG. 1, the side-dump body may be filled with materials to be transported by first moving the cover 52 to either side of the side-dump body. For example, pivot pins 104 and 112 may be removed with the hydraulic cylinders 106 and 118 then being extended to cause the cover 52 to be pivotally moved about pivot pins 102 and 114 to an open position adjacent side 12 as seen in FIG. 5. Materials to be transported may then be placed in the interior of the side body. The hydraulic cylinders 106 and 118 may then be retracted so that cover 52 is moved from the open position as seen in FIG. 5 to the closed position as seen in FIGS. 1 and 4. When the cover 52 is in the position of FIGS. 1 and 4, the side walls 96 and 98 of the cover 52 extend downwardly over the outer edges of the upper ends of the side walls of the side-dump body.

Figure 7:
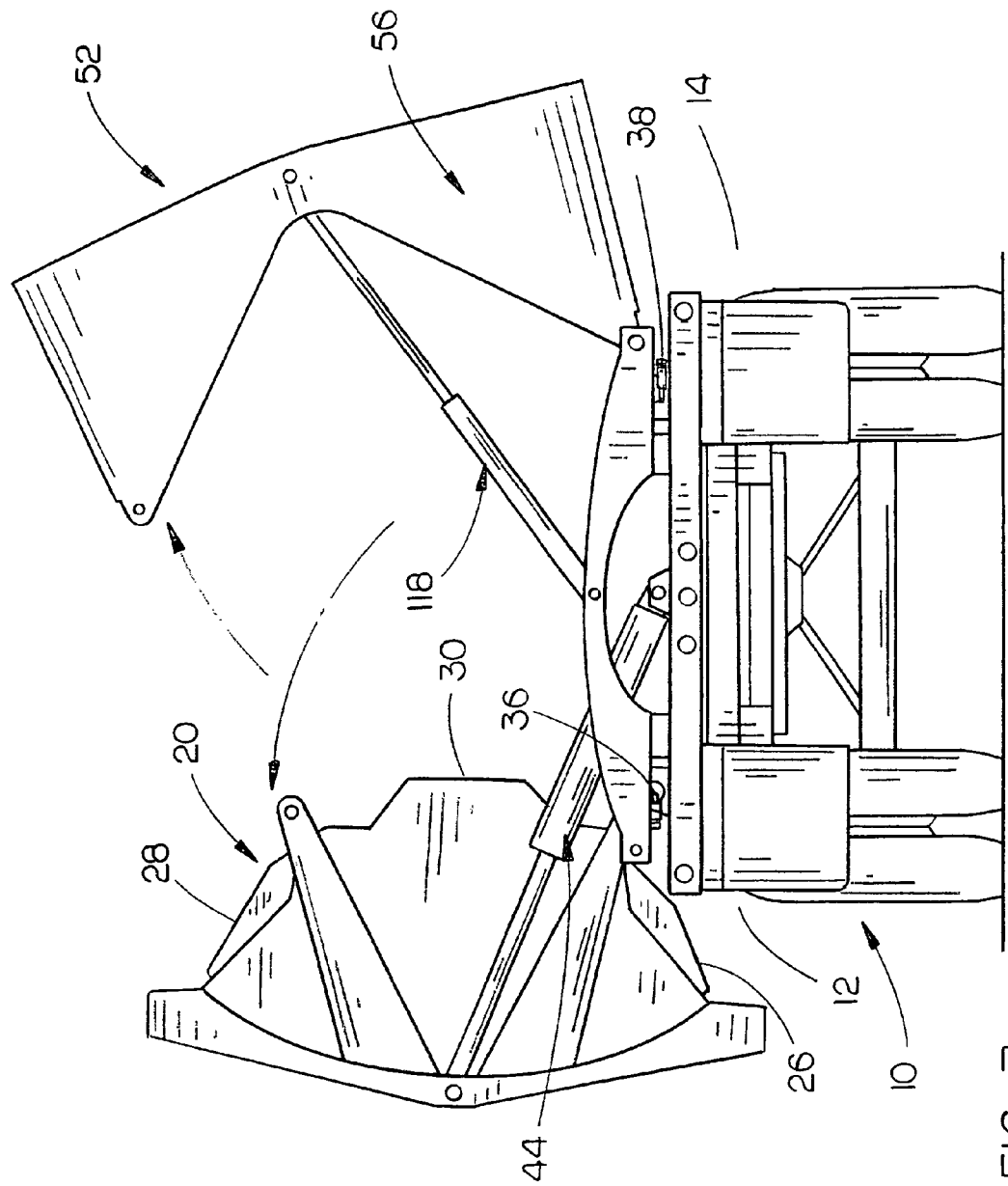
FIG. 7 is a rear view illustrating the cover pivoted to the right side of the trailer and the side-dump body pivoted to a dumping position at the left side of the trailer.

When it is desired to dump the materials within the side-dump body, the cover 52 is then either pivotally moved to the position of FIG. 5 or to the position of FIG. 7 depending upon which side the side-dump body is to be dumped. If the side-dump body is to be dumped to the left side of the vehicle, as seen in FIG. 7, the pivot pins 102 and 114 are removed so that the hydraulic cylinders 102 and 118, upon being extended, will move the cover 52 to the position of FIG. 7. The hydraulic cylinders 40 and 44 may then be extended to cause the side-dump body 20 to be pivotally moved to the position of FIG. 7 so that materials within the side-dump body may be dumped therefrom.

If it is desired to dump the side-dump body to the right, as seen in FIG. 5, the pivot pins 104 and 116 are removed and the hydraulic cylinders 106 and 118 are extended so that the cover 52 is moved to the position of FIG. 5. At that time, the hydraulic cylinders 40 and 44 may be extended to cause the side-dump body to be pivoted to its dumping position at the right side of the vehicle.

Thus it can be seen that a novel rigid cover has been provided for a truck body and more particularly to a side-dump body with the cover being made of a rigid material constructed of metal, plastic or fiberglass. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a wheeled frame means having a rearward end, a forward end, and first and second sides;
a side-dump body movably positioned on said wheeled frame means and being pivotally movable from a transport position to a dumping position;
means for moving said dump body between its transport position and dumping position;
said side-dump body including a front wall, having upper and lower ends, a back wall, having upper and lower ends; a bottom wall portion, first and second upstanding side wall portions, having upper and lower ends, and an open upper end;
a rigid cover selectively pivotally movably positioned on said side-dump body which extends over said open upper end;
said rigid cover being movable from a closed position wherein it extends over said open upper end of said side-dump body to an open position at one side of said side-dump body to enable said side-dump body to pivotally move between its said transport position to its dumping position;
said rigid cover including an upstanding front support having upper and lower ends, an upstanding back support having upper and lower ends, and a top cover portion which is secured to and which extends between the upper ends of said front support and said back support;
said front support having spaced-apart first and second lower ends;
said back support having spaced-apart first and second lower ends;
said first and second lower ends of said front support being selectively operatively pivotally secured to said wheeled frame means at said first and second sides thereof;
said first and second lower ends of said back support being selectively operatively pivotally secured to said wheeled frame means at said first and second sides thereof.

2. The combination of claim 1 wherein said rigid cover may be pivotally moved to an open position at said second side of said wheeled frame means when said first lower ends of said front and back supports are pivotally disconnected from said wheeled frame means.

\* \* \* \* \*